United States Patent [19]
Kaufmann et al.

[11] Patent Number: 4,906,106
[45] Date of Patent: Mar. 6, 1990

[54] PYROMETRIC TEMPERATURE MEASURING INSTRUMENT

[75] Inventors: Meinolph Kaufmann, Baden; Lothar Schultheis, Fislisbach, both of Switzerland

[73] Assignee: BBC Brown Boveri AG, Baden, Switzerland

[21] Appl. No.: 265,956

[22] Filed: Nov. 2, 1988

[30] Foreign Application Priority Data

Nov. 3, 1987 [CH] Switzerland ............ 4297/87-2

[51] Int. Cl.$^4$ .............. G01J 05/08; G01K 11/12
[52] U.S. Cl. ................ 374/131; 350/96.29; 374/162
[58] Field of Search ............ 374/161, 131, 162; 350/96.29

[56] References Cited

U.S. PATENT DOCUMENTS

| 4,217,373 | 8/1980 | Oennen et al. ............ 374/162 X |
| 4,302,970 | 12/1981 | Snitzer et al. ............ 374/161 |
| 4,313,344 | 2/1982 | Brogardh et al. ............ 374/131 X |
| 4,316,388 | 2/1982 | Miller et al. ............ 374/161 |
| 4,437,772 | 3/1984 | Samulski ............ 374/131 X |
| 4,576,486 | 3/1986 | Dils . |
| 4,673,299 | 6/1987 | Dakin ............ 374/131 |
| 4,679,934 | 7/1987 | Ganguly et al. . |

FOREIGN PATENT DOCUMENTS 3050539  6/1986  Fed. Rep. of Germany .
2045921  11/1980  United Kingdom .

OTHER PUBLICATIONS

"Hard Clad Silica (HCS) TM Fibers for Data & Power Transmission" by W. B. Beck, EFOC/LAN/85, p. 146.
"Fiber Optics" by J. C. Daly, 1938, TA1800-4516 Library of Congress, p. 36-37.
Review of Scientific Instruments, vol. 50, No. 5, May 1979, pp. 662-663; D. E. Holmes.
Patent Abstracts of Japan, vol. 9, No. 129 (P-361) (1952), Jun. 5, 1985.
Advances in Instrumentation, vol. 33, Part 1, 1978, pp. 385-402; R. Vanzetti, et al.

*Primary Examiner*—Daniel M. Yasich
*Attorney, Agent, or Firm*—Oblon, Spivak, McClelland, Maier & Neustadt

[57] ABSTRACT

A pyrometric temperature measuring instrument including at least one optical wave guide (1a) with a core (5) and a cladding (6), a light detector (3) and at least one pyrometric sensor (2a). The at least one optical wave guide (1a) has a large numerical aperture. The pyrometric sensor (2a) is located at one end of the at least one optical wave guide (1a) and covers at least a cross-section of the core (5) of an optical wave guide (1a). In a preferred embodiment, the light detector (3) is an InGaAs photodiode. The optical wave guide (1a) has a numerical aperture of 0.3 or more, a diameter of the core (5) of approximately 100 μm or more, and is surrounded by a light-tight cover (7).

7 Claims, 2 Drawing Sheets

PYROMETRIC TEMPERATURE MEASURING INSTRUMENT

FIELD OF THE INVENTION

The invention relates to a pyrometric temperature measuring instrument having at least one optical wave guide with a core and a cladding, a light detector and at least one pyrometric sensor.

PRIOR ART

In order to be able to measure temperatures without interference in the presence of electric and magnetic fields (e.g. in machines or transformers), preference is given to the use of fibre-optic sensors. In this connection, the intensity, phase or polarisation of the light guided in an optical wave guide is influenced with the aid of a temperature-dependent physical quantity, and a temperature is derived from the variations thereby brought about. In this procedure, the optical wave guide can itself serve as sensor (e.g. when a fibre stretches by virtue of a temperature expansion of a body), or merely as transmission element. It is normally the case that light of a light source is coupled into the optical wave guide, guided from the latter to the location of the temperature to be measured, and then guided back to a light detector, where the temperature is derived from an altered light intensity, polarisation or phase.

The pyrometric measurement of temperature can be regarded as alternative to the mentioned measurement principles. It is based on the temperature-dependent heat radiation, which a black body emits, and therefore functions without light source. This principle is employed, above all, to measure high temperatures, i.e. 600° C. and higher. DE-C2 30 50 539, for example, reveals an arrangement for the pyrometric temperature measurement of a melt. In this case, the optical wave guide serves purely as transmission element.

It has also already been proposed to employ the optical wave guide itself as pyrometric sensor. In this connection, reference is made to the EPO publication EP-A2 0 049 866. The optical wave guide has a core, which is suitably doped in its entire length. The doping works as a source of radiation, which produces the heat radiation to be measured. Whereas a corresponding temperature measuring instrument functions without problem for temperatures higher than 300° C., difficulties arise for low temperatures. On the one hand, the core is to generate sufficient heat radiation, so that it is possible to measure its intensity with a photodiode at all, on the other hand, the doping of the core attenuates the heat radiation to be guided too much if the absorptivity of the core is too great. As a consequence of this, doping and length of the optical wave guide must be matched exactly to one another. Of course, it is possible with the proposed temperature measuring instrument to measure only the highest temperature, which prevails at any given point of the optical wave guide.

SUMMARY OF THE INVENTION

It is the object of the invention to create a pyrometric temperature measuring instrument having at least one optical wave guide with a core and a cladding, a light detector and at least a pyrometric sensor, which can accurately detect temperatures below 200° C.

This is achieved according to the invention in that the at least one optical wave guide has a large numerical aperture, and in that the at least one pyrometric sensor is located at one end of the at least one optical wave guide, the pyrometric sensor covering at least a cross-section of the core of the optical wave guide.

In a preferred embodiment, an InGaAs photodiode is used in the light detector. This makes it possible to measure the desired low temperatures with satisfactory accuracy, as well, since it is extremely sensitive and low in noise.

With regard to an optimal transmission of the heat radiation of the pyrometric sensor to the light detector, an optical wave guide is preferred whose numerical aperture is greater than approximately 0.3, whose core has a diameter of more than approximately 100 pm, and which is surrounded by a light-tight cover.

BRIEF DESCRIPTION OF THE DRAWING

The invention is to be explained in more detail below With reference to illustrative embodiments in conjunction with the drawing, in which.

DETAILED DESCRIPTION

In a first illustrative embodiment, a description is given of a pyrometric temperature measuring instrument with a single pyrometric sensor.

Figure 1:
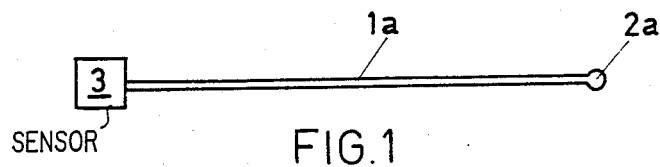
FIG. 1 shows a pyrometric temperature measering instrument with a single pyrometric sensor.

FIG. 1 shows a pyrometric temperature measuring instrument having an optical wave guide 1a, a pyrometric sensor 2a and a light detector 3. The pyrometric sensor 2a is in thermal contact with an object to be measured. It absorbs heat radiation, which is present in an environment of the object to be measured. As a result, it emits a heat radiation itself, the intensity and spectral distribution of which is given by the known Planck's radiation formula. The heat radiation is coupled into the optical wave guide 1a, and guided from there to the light detector 3. The intensity of the heat radiation in a given wavelength region is measured in the light detector 3, and a temperature is derived therefrom.

Figure 2:
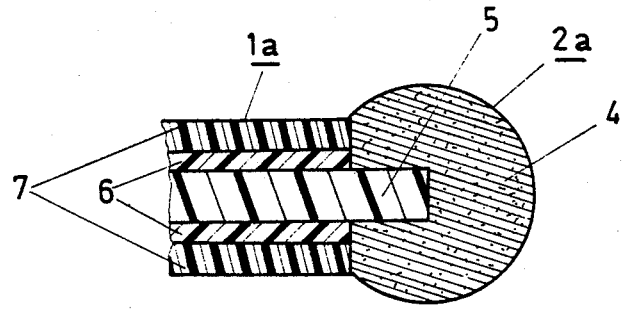
FIG. 2 shows an axial section through a pyrometric sensor.

FIG. 2 shows a section through a pyrometric sensor 2a. In this illustrative embodiment, a glass fibre serves as optical wave guide 1a. A core 5, which is surrounded by a cladding 6, transmits the heat radiation. According to a preferred embodiment, the glass fibre is additionally screened from undesirable effects of stray light by a light-tight cover 7 surrounding the cladding 6.

The cladding 6 is removed from the core 5 at one end of the glass fibre, so that one end of the core 5 projects a little from the glass fibre. According to a preferred embodiment, the pyrometric sensor 2a is a black layer 4 covering the end of the glass fibre in accordance with the teaching sin U.S. Pat. No. 4,576,486. Suitable for this black layer 4 is any material possessing the properties of a black body and which has a high thermal emissivity, i.e. according to the known Kirchhoff's law which has a high, and as far as possible temperature-independent, absorptivity in a given wavelength region of interest. In this sense, a mixture of finely dispersed carbon and a silicon adhesive has proved to be especially well suited. It can be applied quite simply on the end of the glass fibre in the form of a black paste.

The fact that the core 5 projects with its end from the glass fibre is of subsidiary importance. By contrast, it is important that the optical wave guide 1a, and therefore the glass fibre, has a large numerical aperture, preferably greater than approximately 0.3. In this way, as large a proportion as possible of the heat radiation striking the end of the core 5 can be coupled into the optical wave guide 1a. For this reason too, at least a cross-section of the core 5 is completely covered by the pyrometric sensor 2a, i.e. by the black layer 4. The greater the size of a diameter of the core, the greater is also the total intensity of the heat radiation coupled in. The diameter is preferably greater than 100 $\mu$m. An upper boundary for the diameter is given by disadvantageous mechanical properties (e.g. low breaking strength) of the glass fibre. Accordingly, with commercially available glass fibres, the upper boundary for the diameter of the core 5 lies at approximately 1000 pm.

All the measures named serve to make it possible to supply to the light detector 3 as large a proportion as possible of the heat radiation, which is inherently weak at the desired temperatures of less than 200° C., so that in this way temperatures as low as possible can be measured.

Figures 3, 4:
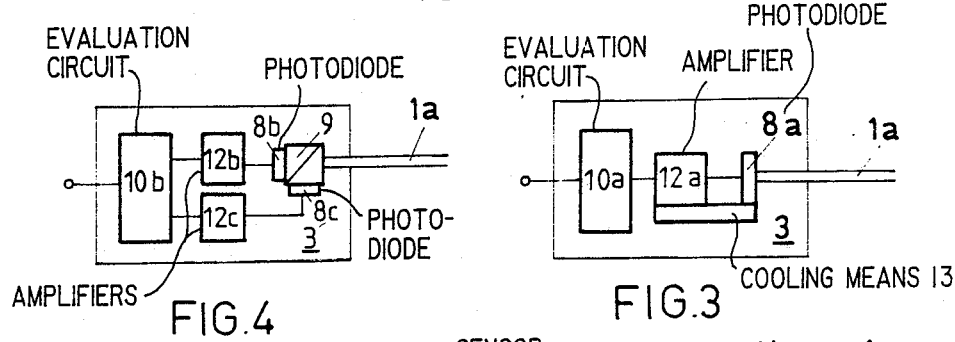
FIG. 3 shows a block diagram of a light detector.
FIG. 4 shows a block diagram of a light detector with internal referencing.

FIG. 3 shows a block diagram of a light detector 3. It comprises a photodiode 8a, an amplifier 12a and an evaluation circuit 10a. The photodiode 8a is arranged at an end of the optical wave guide 1a. It generates a photocurrent rent as a function of the intensity of the incidention. The amplifier 12a amplifies the photocurrent of the photodiode and delivers an output voltage, to which a temperature is allocated in the following evaluation circuit 10a.

The photodiode 8a is to have both a high sensitivity (preferably in a central infra-red region), and also a low noise. As already mentioned, these requirements can best be fulfilled with an InGaAs-photodiode. A transimpedance amplifier, known per se can be used as amplifier 12a. Because of the low intensity of the heat radiation to be detected, the lowest temperature still capable of being measured is determined by a noise from the photodiode 8a and the amplifier 12a. This noise is dependent, in turn, on the temperature of the two. In order to achieve a pyrometric temperature measuring instrument with an especially low, minimal temperature, the photodiode 8a and the amplifier 12a are preferably cooled as schematically shown in FIG. 3, by cooling means 13. In principle, the temperature of a black body can be determined by means of Planck's radiation formula on the basis of the intensity of its heat radiation measured at a given wavelength. The preferred InGaAs photo-diode detects light in a wavelength region, which lies below 1.7 pm. Accordingly, it is sufficient if the pyrometric sensor 2a is black in this wavelength region. For the desired temperatures of less than 200° C., Planck's radiation formula can be replaced by an approximation for short wavelengths. The temperature can be determined in the evaluation circuit 10a either with the aid of such an approximation or with the aid of a stored calibration curve. A relatively simple microprocessor-controlled linearizing circuit, for example, can be used as evaluation circuit 10a.

In itself, the evaluation circuit 10a is not essential to the invention. If the pyrometric temperature measuring instrument is employed as part of a threshold circuit, it is sufficient to monitor the output voltage of the amplifier 5a.

A problem which must be considered is the losses which occur during transmission of the heat radiation of the optical wave guide 1a. In this sense, the bending of the glass fibre has a particularly interfering effect, because it is not foreseeable. Two possibilities of solving this problem are to be briefly addressed below.

Firstly, a glass fibre which is itself already insensitive to bending, can be used as optical wave guide 1a. Particularly well suited for this purpose is a PCS-fibre (PCS = plastic-clad silica).

Secondly, a so-called internal referencing can be undertaken in the light detector 3. This can be realized, for example, with the arrangement explained below.

FIG. 4 shows a block diagram of a light detector 3 with internal referencing. Arranged at one end of the optical wave guide 1a is a wavelength-discriminating beam splitter 9. A first wavelength region of the heat radiation is incident on a first photodiode 8b and a second wavelength region on a second photodiode 8c. In each case, in a fashion analogous to the light detector 3 described in connection with FIG. 3, a photocurrent of the photodiode 8b or 8c is fed to an amplifier 12b or 12c respectively. A temperature is derived in an evaluation circuit 10b from a ratio of an output voltage of the first amplifier 12b (corresponding to a light intensity in a first wavelength region) and an output voltage of the second amplifier 12c (corresponding to a light intensity in a second wavelength region).

Since, on the one hand, a loss determined by a bending of the glass fibre is independent of wavelength, and, on the other hand, a change of temperature leads to wavelength-dependent changes in the intensity of the heat radiation, an interference effect determined by bending (or being quite generally independent of wavelength) can be eliminated with the light detector 3 described.

A second embodiment of the invention relates to a pyrometric sensor integrated into a glass fibre.

Figures 5, 7:
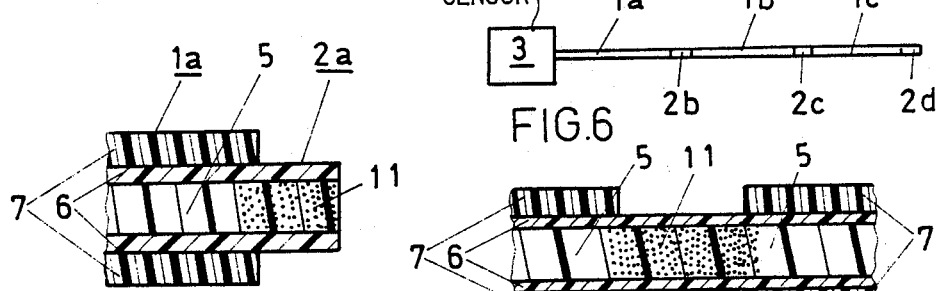
FIG. 5 shows an axial section through a pyrometric sensor integrated into a glass fibre.
FIG. 7 shows an axial section through a pyrometric sensor integrated into a glass fibre.

FIG. 5 shows an axial section through such a pyrometric sensor 2a. A glass fibre, surrounded by a light-tight cover 7 and consisting of a core 5 and a cladding 6, serves as optical wave guide 1a. An end of the glass fibre projects from the cover 7. At this end, the core 5 of the glass fibre is provided with a suitable, local doping 11 and functions as pyrometric sensor 2a, in that it couples a heat radiation into the optical wave guide 1a.

The doping 11 can be black in a wavelength region detected by the photodiode 8a. If the preferred InGaAs photodiode is used as the photodiode 8a, the doping 11 advantageously consists of a transition metal.

The projecting end of the glass fibre can, also, for example be unclad and/or surrounded by a protective layer transparent in the wavelength region of interest.

A third illustrative embodiment relates to a pyrometric temperature measuring instrument with several pyrometric sensors, which can be used as a so-called hot-spot detector. Understood by a hot-spot detector is a temperature measuring instrument which simultaneously measures the temperatures of several objects to be measured, but outputs only the highest measured temperature.

Figure 6:
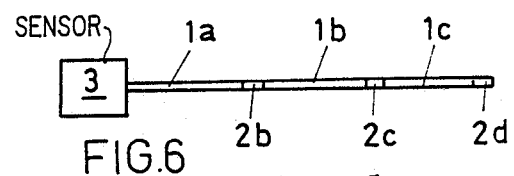
FIG. 6 shows a pyrometric temperature measuring instrument with several pyrometric sensors.

FIG. 6 shows such a pyrometric temperature measuring instrument. As an example, three pyrometric sensors 2b, 2c, 2d are connected to a light detector 3. They are connected in series, being connected with the light detector 3, with an optical wave guide 1a and one after the other with two further optical wave guides 1b and 1c. Optical wave guides 1a, 1b, 1c and the light detector 3 can have the form already described above. The pyrometric sensors 2b, 2c, 2d have the following construction.

FIG. 7 shows an axial section through such a pyrometric sensor. The optical wave guides 1a, 1b and 1c are embodied in a single glass fibre with a core 5 and a cladding 6. (Here, too, the glass fibre is surrounded by a lighttightcover 7, corresponding to a preferred embodiment.) The pyrometric sensors 2b, 2c, 2d are integrated into this glass fibre, in that the glass fibre has a local doping 11 at individual locations.

By contrast with the second illustrative embodiment (cf. FIG. 5), the doping 11 may not be black in a given wavelength region of interest. The point is that a heat radiation of the pyrometric sensor 2c, which reaches the pyrometric sensor 2b via the optical wave guide 1b, must be able, to pass the sensor 2b at least partially, in order to be at all able to reach the light detector 3 via the optical wave guide 1a. The absorptivity of the doping 11 must therefore be optimized so that, on the one hand it is large enough to be able to generate a heat radiation of detectable intensity, and, on the other hand, it is sufficiently small not to attenuate too strongly heat radiation passing through.

The following train of thought indicates that an optimum can be found for the absorptivity: at a given temperature, the intensity of the heat radiation of a pyrometric sensor increases linearly with the absorptivity of the doping 11. By contrast (for the approximation for short wavelengths), for a given absorptivity, it increases with temperature in an essentially exponential manner. That is to say, for each absorptivity of less than 100%, it is possible to find a temperature difference (between the pyrometric sensor to be traversed, e.g. 2b, and the pyrometric sensor, e.g. 2d, whose heat radiation is to be allowed to pass through the light detector 3), for which an absorption in the doping to be traversed, is compensated by the higher intensity, to be ascribed to a higher temperature, of a heat radiation passing through. The temperature difference which a "covered" pyrometric sensor (e.g. 2d) must have as contrasted with the other, "covering" pyrometric sensors (e.g. 2b) in order that its heat radiation should penetrate at all as far as the light detector 3 determines the lowest possible temperature difference of the pyrometric temperature measuring instrument which is still resolvable. It stands to reason that this temperature difference increases with the number of the pyrometric sensors connected one after another.

Another arrangement according to the invention for a hot-spot detector comes from an extension of the first illustrative embodiment (cf. FIG. 1). In this connection, several optical wave guides are connected with the aid of directional couplers (3 dB couplers etc.) to a common light detector 3. Each optical wave guide has at one end a pyrometric sensor which has the properties of a black body in a given wavelength region. Although this requires optocouplers and more optical wave guides, on average, than required with the third illustrative embodiment, in return, the pyrometric sensors no longer mutually influence one another.

The capability of the invention is now to be presented with reference to the measurement results which were obtained with a pyrometric temperature measuring instrument according to the invention.

The pyrometric temperature measuring instrument employed essentially corresponds to that of the first illustrative embodiment. A PCS-fibre (plastic Clad Silica-fibre) approximately 9 m long, in which the diameter of the core 5 is approximately 300 μm, was employed as optical wave guide 1a. The photodiode 8a was an InGaAs photodiode from Fujitsu (FID 13Z32TU, dark current 0.5 nA) and the amplifier 12a an fA operational amplifier from Burr Brown (OPA 128, 100GOhm negative feedback resistance). A mixture of finely dispersed carbon and a silicon adhesive served as pyrometric sensor 2a.

Figure 8:
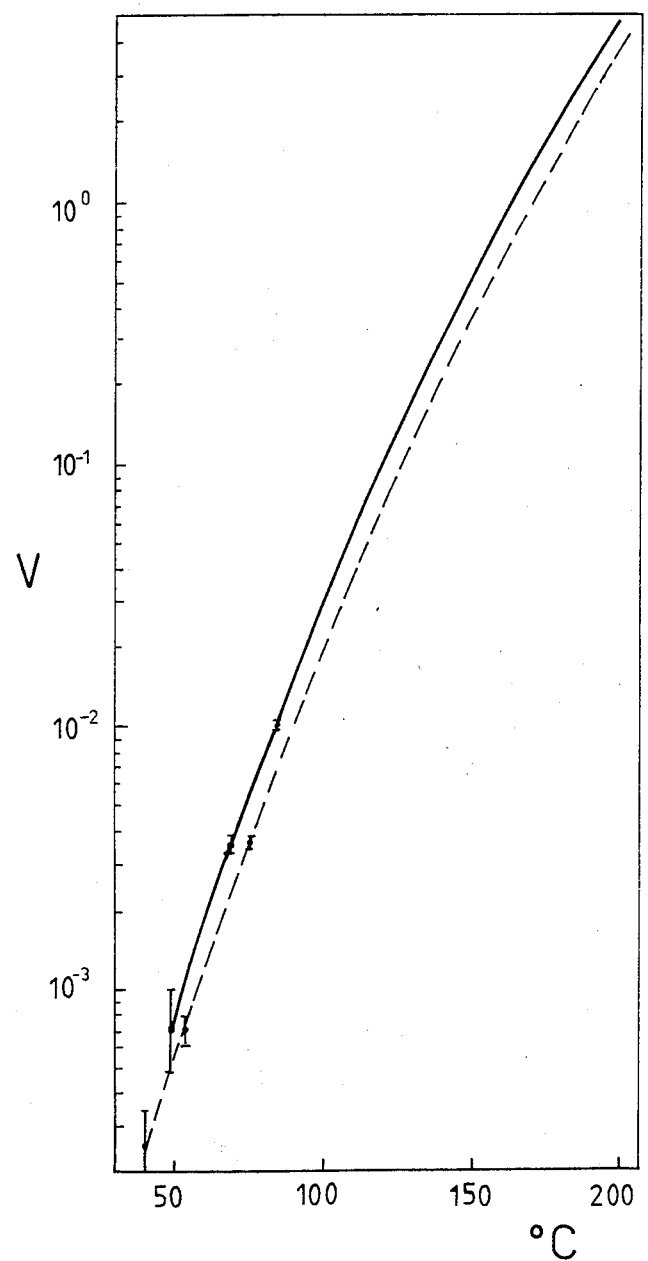
FIG. 8 shows a representation of an output voltage of an amplifier, as a function of the temperature of a pyrometric sensor.

FIG. 8 is a representation of an output voltage of the amplifier 10a, as a function of the temperature of the pyrometric sensor 2a. Given on the abscissa is a temperature in ° C., and on the ordinate an output voltage in V. The unbroken curve is the output voltage in the case that the light detector 3 is not cooled (~25° C.). In this case, the minimum temperature still detectable amounts to approximately 50° C. If, by contrast, the light detector is cooled to approximately 0° C., then this minimum temperature lies at approximately 40° C. (dashed curve).

The measured temperature is subject to an uncertainty, which decreases exponentially with increasing temperature. Whereas at 60° C., e.g., it still amounts to approximately ±5° C., at 90° C. it still lies at only approximately ±0.5° C. Because of such low uncertainties, for temperatures greater than 100° C. this pyrometric temperature measuring instrument is exceptionally well suited for applications in temperature threshold switches.

It may be said in conclusion that the various features of the preferred embodiment may be combined with one another in a largely free fashion, so that it is possible to construct an especially suitable embodiment of the invention for the most varied applications, in each case. In addition to the mentioned advantages, it is to be noted that the pyrometric sensor of the pyrometric temperature measuring instrument can be manufactured in an especially low-cost fashion.

We claim:

1. Pyrometric temperature measuring instrument comprising:

at least one optical waveguide having a core and a cladding;

at least one pyrometric sensor provided at one end of said at least one optical waveguide; and a liquid detector;

wherein:

said optical waveguide is a plastic clad silica (PCS) fiber, the core of which has a diameter of more than approximately 100 μm and wherein the optical waveguide has a numerical aperture of more than approximately 0.3;

said pyrometric sensor is a black layer covering at least a cross-section of the core at an end of the optical waveguide and possessing the properties of a black body at least in a wavelength region detectable by the liquid detector;

said light detector comprises a Indium, Galium, Arsenic (InGaAs) photodiode.

2. Pyrometric temperature measuring instrument comprising:
   at least one optical waveguide having a core and a cladding;
   at least one pyrometric sensor provided at one end of said at least one optical waveguide; and
   a light detector;
   wherein:
   said optical waveguide is a plastic clad Silica (PCS) fiber surrounded by a light-tight cover, the core of which has a diameter of more the approximately 100 μm, and wherein the optical waveguide has a numerical aperture of more than approximately 0.3;
   said pyrometric sensor is a black layer covering at least a cross-section of the core at an end of the optical waveguide and possessing the properties of a black body at least in a wavelength region detectable by the light detector;
   said light detector is cooled and comprises an InGaAs photodiode and means for cooling said light detector are provided.

3. Pyrometric temperature measuring instrument comprising:
   at least one optical waveguide having a core and a cladding;
   at least one pyrometric sensor provided at one end of said at least one optical waveguide; and
   a light detector;
   wherein:
   said optical waveguide is a plastic clad silica (PCS) fiber, the core of which has a diameter of more the approximately 100 μm, and wherein the optical waveguide has a numerical aperture of more than approximately 0.3;
   said pyrometric sensor is a black layer covering at least a cross-section of the core at an end of the optical waveguide and possessing the properties of a black body at least in a wavelength region detectable by the light detector;
   said light detector comprises at least two Indium, Galium, Arsenic (InGaAs) photodiodes, by which to determine a temperature light intensities are measured in the light detector in two different wavelength regions and a temperature is derived from a ratio of the two measured intensities.

4. Pyrometric temperature measuring instrument according to claim 3, comprising:
   means for cooling the light detector.

5. Pyrometric temperature measuring instrument according to one of claims 1, 2, or 3, wherein the black layer is a mixture of finely dispersed carbon and a silicon adhesive.

6. Pyrometric temperature measuring instrument comprising:
   at least one optical waveguide having a core and a cladding;
   at least one pyrometric sensor provided at one end of said at least one optical waveguide; and
   a light detector;
   wherein:
   said optical waveguide has a core of a diameter of more than approximately 100 μm and numerical aperture of more than approximately 0.3;
   said optical waveguide and the pyrometric sensor are integrated into a glass fiber the pyrometric sensor being formed by a local doping of the core of the glass fiber by a material possessing the properties of a black body at least in a wavelength region detectable by the light detector;
   said light detector comprises an Indium Galium, Arsenic (InGaAs) photodiode.

7. Pyrometric temperature measuring instrument comprising:
   at least one optical waveguide having a core and a cladding;
   several pyrometric sensors; and
   a light detector;
   wherein:
   said optical waveguide has a core of a diameter of more than approximately 100 μm and numerical aperture of more than approximately 0.3;
   said optical waveguide and the pyrometric sensors are integrated into a glass fiber the pyrometric sensors being formed by several local dopings of the core of the glass fiber by a material possessing the properties of a black body at least in a wavelength region detectable by the light detector;
   said light detector comprises an Indium, Galium, Arsenic (InGaAs) photodiode.

* * * * *